United States Patent [19]

Mullaney

[11] 4,163,563

[45] Aug. 7, 1979

[54] ROTARY BELLOWS SEAL WITH VIBRATION-DAMPING MEANS

[75] Inventor: John J. Mullaney, Warwick, R.I.

[73] Assignee: Sealol, Inc., Warwick, R.I.

[21] Appl. No.: 895,801

[22] Filed: Apr. 12, 1978

[51] Int. Cl.² .............................................. F16J 15/36
[52] U.S. Cl. ...................................... 277/88; 277/42; 277/25
[58] Field of Search ...................... 277/25, 30, 42, 83, 277/88, 89, 91

[56] References Cited

U.S. PATENT DOCUMENTS

| | | | |
|---|---|---|---|
| 2,574,808 | 11/1951 | Wolfe | 277/88 |
| 3,276,780 | 10/1966 | Andresen et al. | 277/42 |
| 3,372,939 | 3/1968 | Coulombe et al. | 277/88 |
| 3,397,894 | 8/1968 | Mastriforte et al. | 277/30 |
| 3,515,394 | 6/1970 | Stevens | 277/88 |
| 3,747,943 | 7/1973 | Dietzel et al. | 277/30 |

Primary Examiner—Robert S. Ward, Jr.
Attorney, Agent, or Firm—Finnegan, Henderson, Farabow & Garrett

[57] ABSTRACT

A split-ring radially expandable under centrifugal force for damping vibrations of a rotary annular bellows by pressing against the inner surfaces of at least some of the convolutions of the bellows as the speed of the bellows increases. Preferably, the split-ring is positioned in a channel for rotation with the bellows and for radial expansion as a function of the rotary movement, while restrained from axial movement with respect to the bellows.

29 Claims, 3 Drawing Figures

ROTARY BELLOWS SEAL WITH VIBRATION-DAMPING MEANS

BACKGROUND OF THE INVENTION

This invention relates to a vibration-damping means for a rotary annular bellows and, more particularly, to a vibration-damping means for a rotary annular bellows seal assembly.

A rotary annular bellows seal assembly is used generally to apply an axial force between two sealing members having relative rotation to each other. A rotating bellows seal assembly used with a rotating shaft usually includes an annular bellows having a plurality of axially-expandable convolutions sealingly connected at one end to the shaft and at the other end to a first seal ring, and a mating seal ring fixed from rotation with the shaft and sealingly engaging the first seal ring. The convolutions of the bellows provide a resilient bias for maintaining the seal rings in firm contact, while the bellows itself provides a sealed area around the shaft.

The satisfactory operation of a rotary bellows seal assembly requires that the mating surfaces between the seal rings be held tightly together during relative rotation to prevent leakage of a fluid or the like between the rings.

In operation, the bellows may be subjected to vibrations from different sources in addition to its natural vibration frequency. When a rotary bellows seal assembly is employed in an apparatus which is subject to vibrations, the convolutions of the bellows pick up these vibrations. For instance, a rotary shaft may pulsate due to its connection to other rotating parts of the apparatus and thus ultimately introduce vibration into the convolutions of a bellows attached to the rotary shaft.

Vibration may also be caused by a wobbling motion of the mating ring which may result from imperfect axial alignment between the seal rings. Vibration may be caused by friction between the sealing faces of the seal rings tending to impart a stick-slick motion to those faces. Vibrations may even be caused by turbulence in a fluid adjacent the bellows assembly. Such vibrations are quite frequently developed in aircraft mainshaft seals, automotive seals, pump seals, compressor seals and the like.

Whatever the source of the vibrations, when the mechanical vibrations are superimposed on the natural frequency of vibration of the convolutions of the bellows, the life of the bellows is significantly shortened due to fatigue in the convolutions resulting from excessive vibrations. Conventional mechanical vibration-damping means, such as plates, clips, and fingers, reduce the amplitude of vibration of the bellows. However, these known devices continuously rub on the inner or outer peripheries of the convolutions of the annular bellows and eventually cause failure of the bellows. These conventional vibration-damping devices are also relatively complex, expensive, or difficult to maintain due to their elaborate configuration or the materials from which they are made.

BRIEF SUMMARY OF THE INVENTION

Accordingly, it is a primary object of this invention to eliminate the above-described problems of vibration in rotary bellows.

Another object of this invention is to increase the wear life span of a rotary bellows while satisfactorily damping its vibration.

It is a further object of this invention to provide a rotary bellows seal assembly having a vibration-damper which is relatively inexpensive to manufacture and install while achieving an increased wear life for the bellows.

Additional objects and advantages of the invention will be set forth in part in the description which follows, and in part will be obvious from the description, or may be learned from practice of the invention. The objects and advantages of the invention may be realized and obtained by means of the instrumentalities and combinations particularly pointed out in the appended claims.

To achieve the foregoing objects and in accordance with the purpose of the invention, as embodied and broadly described herein, the vibration-damping device comprises: an elongated rotatable member; an annular bellows surrounding at least a portion of the rotatable member; means for rotating the bellows with the rotatable member; and means rotating with the rotatable member for exerting pressure against the inner periphery of the annular bellows in response to the centrifugal force created by the rotatable member on the pressure-exerting means.

It is preferred that the vibration-damping device include means for restraining the pressure-exerting means from axial movement with respect to the annular bellows.

In an illustrated embodiment, the vibration-damping device is incorporated in a bellows seal assembly for a rotatable member comprising: a resilient annular bellows fixed to, and surrounding, the rotatable member for rotation therewith; a rotating seal fixed to the bellows; a mating seal for sealingly engaging the rotating seal, the rotating seal being under bias from said bellows toward the mating seal; and means for exerting a vibration-damping pressure on the bellows in response to centrifugal force created by the rotation of the rotatable member.

Preferably, the vibration-damping pressure means is a split-ring positioned between the rotatable member and the annular bellows and the annular bellows includes axially-expandable convolutions surrounding the shaft.

In the preferred embodiment the bellows seal assembly includes support means disposed between the rotatable member and the bellows for carrying the split-ring, the support means being fixed to the rotatable member.

It is preferred that the support means includes a sleeve having a channel formed in its outer circumferential surface for containing the split-ring, and that the split-ring have flanged ends extending inwardly into the channel for containing the split-ring.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENTS

Reference will now be made in detail to the present preferred embodiment of the invention, an example of which is illustrated in the accompanying drawings.

Figure 1:
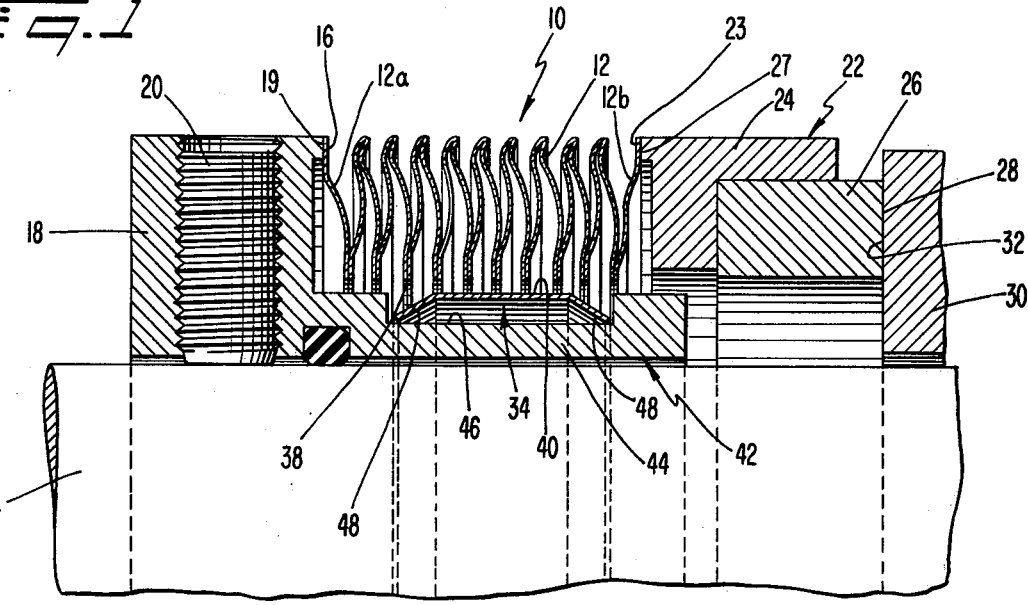
FIG. 1 is a fragmented cross-sectional view of the upper half of a rotary annular bellows seal assembly constructed in accordance with the teachings of this invention including a vibration-damping split-ring in a non-activated position.
Figure 2:
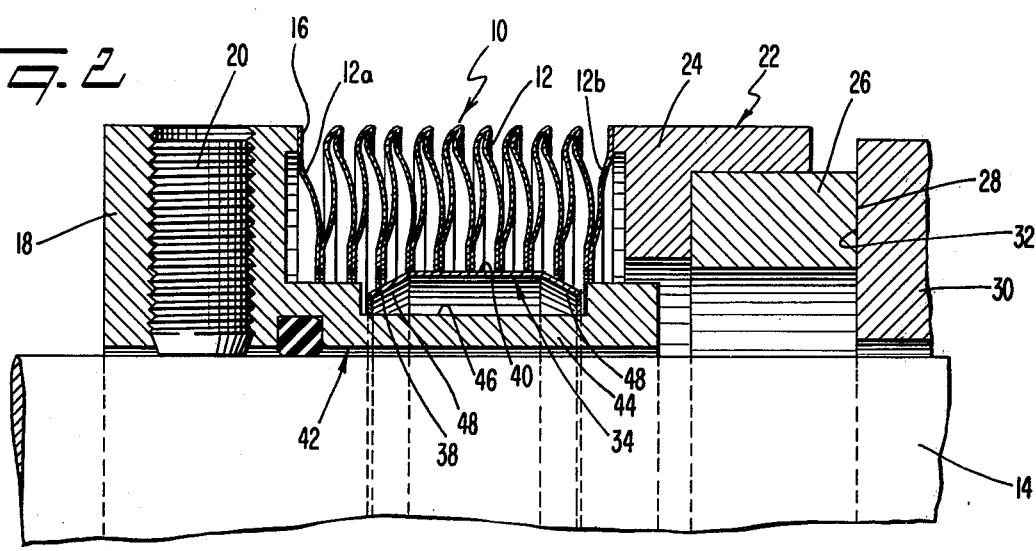
FIG. 2 shows the split-ring of FIG. 1, in an activated position.

Referring now to FIGS. 1 and 2, the vibration-damping means of the invention is illustrated in a bellows seal assembly for preventing leakage along a rotatable member of any fluid which may surround the seal assembly.

The illustrated bellows seal assembly includes an annular bellows, indicated generally as 10, having a plurality of convolutions 12 surrounding a shaft 14. As known in the art, the annular convolutions 12 are resiliently axially-expandable and are usually composed of a series of annular disks or plates welded together alternately at their inner and outer edges to form a highly resilient bellows. A spring-like metal or other like material can be selected for the discs in accordance with the environment to which it will be exposed. Since it is intended that the annular seal assembly function in a fluid, it is necessary that bellows 10 itself form a seal to prevent fluid from passing between the faces of convolutions 12 toward shaft 14.

Means are included for rotating the bellows with the rotatable member in that one end 16 of bellows 10 is sealingly attached to a mounting sleeve 18 fixed to shaft 14. Bellows 10 can be attached to the mounting sleeve 18 as by welding of the end convolution disk 12a to an annular shoulder 19 on the mounting sleeve 18. Mounting sleeve 18 is locked to shaft 14 by any suitable means, such as a set screw 20 tightened against shaft 14. By this arrangement rotary annular bellows is conventionally driven by the shaft.

The illustrated bellows seal assembly in which the vibration-damping means of the invention is incorporated, further includes a rotating annular seal, indicated generally as 22, attached to the other end 23 of bellows 10. Rotating seal 22 constitutes a carrier ring 24 surrounding the shaft 14 and a sealing ring 26 surrounding the shaft and fixedly supported by the carrier ring 24. As shown, carrier ring 24 is fixed to bellows 10 such as by welding an annular shoulder 27 on the carrier ring to the last convolution disk 12b at the end 23 of the bellows 10 extending away from the mounting sleeve 18.

Rotating seal 22 is preferably fabricated of two elements, carrier ring 24 and sealing ring 26, for ease of construction but the two elements are sealed together in a substantially integral unit. The carrier ring 24 is usually L-shaped for applying the bias of the bellows 10 to a sealing face 28 of sealing ring 26 and for retaining the sealing ring against radial movement under centrifugal force.

The illustrated bellows seal assembly further includes a mating seal 30 for sealing engagement with the rotating seal 22. The mating seal 30, as illustrated, constitutes a ring surrounding the shaft 14 but not rotating therewith. In a customary use of a bellows seal assembly, the mating seal ring 30 is fixedly attached to a housing (not shown) which contains a fluid which the seal assembly retains in the housing. In other uses of a bellows seal assembly the mating seal ring 30 may be attached to a second rotating member (not shown) wherein there is differential rotation between the second rotating member and the shaft 14.

As shown, the fixed ring 30 has a sealing face 32 opposed to the sealing face 28 for mating engagement therewith. Seal faces 28 and 32 are generally lapped to a flat, mirror-like finish to provide a mechanical seal therebetween tht is vitually fluid-tight. Seal rings 26 and 30 can be made of a variety of materials, but usually one is carbon and the other steel, tungsten carbide, or a similar material.

In accordance with the invention, the bellows seal assembly includes a vibration-damping device having means rotating with the rotatable member for exerting pressure on the bellows in response to centrifugal force created by the rotation of the rotatable member. Pressure can be exerted against the inner or outer periphery of the annular bellows.

Figure 3:
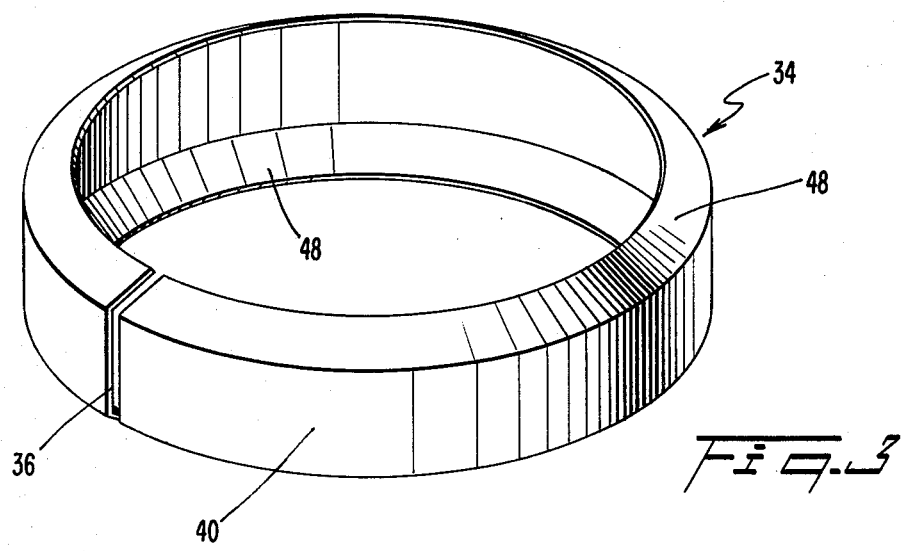
FIG. 3 is a perspective view of the vibration-damping split-ring of FIGS. 1 and 2.

As embodied here, the vibration-damping means comprises a split-ring, numbered generally as 34, surrounding the shaft 14 and positioned between the shaft and the convolutions 12 of the bellows 10. The split-ring 34, as best shown in FIG. 3, contains a lateral split 36 across its width so that the ring expands radially outwardly into pressure contact with the inner periphery of at least a portion of convolutions 12 in response to centrifugal force created by rotation of the shaft 14.

As here embodied, pressure contact is made with the annular convolutions 12 at their inside-diameter surfaces 38, by the outer circumferential surface 40 of the split-ring 34. By making the circumferential surface 40 of split-ring 34 complementary with the inside-diameter surfaces 38 of the convolutions 12, the vibration-damping pressure contact is improved and wear on the convolutions is reduced. In the preferred embodiment shown, the split-ring 34 has a relatively wide outer circumferential surface 40 to provide pressure contact with a substantial portion of the inside-diameter surfaces 38 of the convolutions 12 to provide an effective damping of vibration.

As here embodied, the radial expansion of split-ring 34 and the contact pressure of the split-ring on the convolutions 12 is related to the amount of centrifugal force developed by rotation of the shaft 14. Generally, speaking, the higher the rotational speed of shaft 14, the greater the degree of centrifugal force. Consequently, there is more pressure contact on the convolutions 12 by split-ring 34 at a higher rotational speed than at a lower rotational speed of shaft 14. This generally ensures no relative movement between split-ring 34 and convolutions 12 at high speeds. The convolutions 12 continue to be axially expandable, however, during pressure contact by split-ring 34 for maintaining bias on the rotating ring 26, the axial force applied by bellows 10 being greater than the radial force being applied the convolutions 12 by split-ring 34 under centrifugal force.

It can be seen that the amount of radial expansion and contact pressure of split-ring 34 on convolutions 12 in relation to the developed centrifugal force can be controlled by predetermining the mass of the split-ring. By varying the mass of ring 34, the vibration-damping effect on bellows 10 can be regulated as to given factors and conditions, or on a particular application of the bellows seal assembly to the rotatable member. It is preferred, however, that split-ring 34 be fabricated such that it expands radially outwardly to establish at least an initial pressure contact with inside-diameter surfaces 38 of convolutions 12 for damping vibration where there is a relatively low rotational speed of the shaft 14.

In accordance with the invention, the bellows seal assembly further includes support means disposed between the rotatable member and the bellows for carrying the split-ring, the split-ring being fixed to the rotatable member.

As here embodied and best seen in FIGS. 1 and 2, the support means, numbered generally as 42, includes a support sleeve 44 fixed to and extending axially from mounting sleeve 18 between the shaft 14 and the inside-diameter surfaces 38 of the convolutions 12. Preferably support sleeve 42 is integral with mounting sleeve 18 for rotation with shaft 14.

As here embodied, support sleeve 42 has an axially-extending channel 46 formed in its outer circumferential surface in which is positioned the vibration-damping means, i.e., split-ring 34. Preferably, split-ring 34 has flanges 48 extending inwardly into the channel 46 for substantially preventing axial movement of the ring in both its non-expanded and expanded radial positions. The width of flanges 48 as well as their angle of declension from the circumferential surface 40, and the depth of channel 46, are determined so as to retain ring 34 in the channel under conditions of maximum centrifugal force on the ring.

In the preferred embodiment, as previously stated, split-ring 34 is dimensioned for pressure contact with a substantial portion of the annular convolutions 12. To accommodate the circumferential surface, i.e., the axial width, of split-ring 34, support sleeve 44 may have an axial length which extends beyond the axial length of the bellows 10. It is clear, of course, that the support sleeve 44 must not interfere with possible axial movement of rotating seal 22 under the bias of bellows 10. The inner-diameter of rotating seal 22 is such as to allow spacing between the end of support sleeve 44 and carrier ring 24. This configuration allows design flexibility in the sizing and arrangement of carrier ring 24 and sealing ring 26, while avoiding contact of these rings with support sleeve 44 during operation of the assembly.

The operation of the vibration-damping means of the invention in the environment rotary bellows seal assembly, will now be described.

As previously stated, a rotary annular bellows has a tendency to vibrate in use during high rotational speed.

The vibration-damping split-ring 34 is in its non-activated position in channel 46 of support sleeve 44 when there is no rotation of shaft 14, and during relatively low rotational speed of the shaft when there is insufficient centrifugal force to cause the ring to expand. Under these conditions, vibration normally does not develop in the bellows 10. The axially-expandable, resilient convolutions 12 of annular bellows 10 surrounding shaft 14 are slightly out of contact with ring 34 and there is no rubbing or frictional engagement to wear the bellows should an axial force be applied to the bellows during start-up rotation of the shaft.

When the shaft 14 reaches a predetermined rotational speed, split-ring 34 is expanded radially to establish an initial pressure contact with inside-diameter surfaces 38 of convolutions 12 for effectively damping vibration in the convolutions. As previously stated, the degree of expansion of split-ring 34 under centrifugal force to establish an initial pressure contact with convolutions 12 can be predetermined in accordance with the mass of the ring.

When shaft 14 has reached the predetermined rotational speed wherein split-ring 34 has expanded radially, pressure contact is made with the inside-diameter surfaces 38 of convolutions 12 by outer circumferential surface 40 of the ring. As the rotational speed of shaft 14, and thereby ring 34, exceeds this predetermined value, the contact pressure of the ring against convolutions 12 continues to increase in response to the increased centrifugal force. The radial pressure force against convolutions 12 is thereby increased to prevent normal movement from occurring between ring 34 and convolutions 12. This increased radial force substantially prevents rubbing between the surfaces of convolutions 12 and ring 34 and thus increases the wear life of bellows 10. When ring 34 is in pressure contact with convolutions 12, the convolutions, however, continue to bias the sealing ring 26 toward the sealing ring 30, i.e., the axial force applied by bellows 10 is greater than the radial force being applied to convolutions 12 by the ring.

When the rotational shaft speed is reduced, ring 34 will contract toward its unexpanded configuration as a function of the decreased centrifugal force.

Although the invention has been here described in the environment of a rotary bellows seal assembly, it is apparent that the device of the invention for damping vibration of a rotary annular bellows is not limited in its utility to a seal assembly. The principles of the invention are applicable to damping the vibrations of any rotary annular bellows.

It will be apparent to those skilled in the art that modifications and variations could be made from the vibration-damping means of the invention as illustrated herein without departing from the scope and spirit of the invention. It can be seen that vibration-damping means in accordance with the invention is particularly useful in preventing fatigue failure and increasing the wear life of rotary bellows.

What is claimed is:

1. In an apparatus having, in combination, an elongated rotatable member, an annular bellows surrounding at least a portion of the rotatable member, and means for rotating the bellows with the rotatable member, a device for damping vibration in the bellows comprising:

damping means rotating with the rotatable member and normally out of engagement with said bellows, said damping means being operable in response to the centrifugal force thereon during rotation of the rotatable member to exert pressure against the inner periphery of the annular bellows.

2. The device of claim 1 which further includes means for restraining said pressure-exerting means from substantial axial movement with respect to said annular bellows.

3. The device of claim 1 wherein said means for exerting pressure against said bellows includes a radially-expandable split-ring positioned between said bellows and said rotatable member.

4. The device of claim 3 further comprising support means disposed between said rotatable member and said bellows for carrying said split-ring, said support means being fixed to said rotatable member.

5. In an apparatus having, in combination, an elongated rotatable member, an annular bellows surrounding at least a portion of the rotatable member, and means for rotating the bellows with the rotatable member, a device for damping vibration in the bellows comprising:

a support sleeve disposed between said rotatable member and said bellows and being fixed to said rotatable member, said sleeve including a channel formed in the circumferential surface thereof;

a radially-expandable split ring carried in said channel and rotatable with said support sleeve for exerting pressure against the inner periphery of the annular bellows in response to the centrifugal force created by the rotatable member on the split ring, said channel restraining said split ring from substantial axial movement with respect to said annular bellows.

6. The device of claim 5 including flanges on the sides of said split-ring extending inwardly into said channel.

7. A bellows seal assembly for a rotatable member comprising:
(a) a resilient annular bellows fixed to, and surrounding, the rotatable member for rotation therewith;
(b) a rotating seal fixed to said bellows;
(c) a mating seal for sealingly engaging said rotating seal, said rotating seal being under bias from said bellows toward said mating seal; and
(d) means normally out of engagement with said bellows and operable in response to centrifugal force created by the rotation of said rotatable member to exert a vibration-damping pressure on said bellows.

8. The bellows seal assembly of claim 7 wherein the rotatable member is a shaft, said bellows comprises a plurality of annular axially-expandable convolutions surrounding said shaft, and said vibration-damping means is disposed between said shaft and said convolutions and rotates with said shaft.

9. The bellows seal assembly of claim 8 wherein said vibration-damping means comprises a split-ring surrounding said shaft and expandable radially into pressure contact with at least a portion of said convolutions in response to centrifugal force created by the rotation of said shaft.

10. The bellows seal assembly of claim 9 wherein the mass of said split-ring is predetermined for controlling the pressure of the split-ring on the convolutions as a function of the centrifugal force.

11. The bellows seal assembly as set forth in claim 9 wherein said split-ring is expanded radially to establish pressure contact with said convolutions for effectively damping vibration in said convolutions at a relatively low rotational speed of said rotating shaft.

12. The bellows seal assembly of claim 10 wherein said predetermined mass of said split-ring provides pressure on said convolutions tending to prevent relative axial movement between said split-ring and said convolutions, subject to the maintenance of said bias by said bellows on said rotating seal.

13. The bellows seal assembly in claim 11 wherein said convolutions of said bellows are axially expandable during pressure contact by said split-ring when the axial force on said bellows is greater than the radial force being applied to said convolutions of the bellows.

14. The bellows seal assembly of claim 9 wherein said split-ring has an outer circumferential surface adapted for pressure contact with at least a substantial portion of inside-diameter surfaces of said annular convolutions.

15. The bellows seal assembly of claim 9 further comprising support means disposed between said rotating shaft and said convolutions for carrying said split-ring adjacent the inside-diameter surfaces of said convolutions of the bellows.

16. A bellows seal assembly for a rotatable shaft comprising:

(a) a resilient annular bellows including a plurality of annular axially-expandable convolutions surrounding said shaft, said bellows having a first end fixed to said shaft for rotation therewith;
(b) a rotating seal fixed to said bellows;
(c) a mating seal for sealingly engaging said rotating seal, said rotating seal being under bias from said bellows toward said mating seal;
(d) a support sleeve fixed to said shaft and within said bellows;
(e) a split ring carried on said support sleeve adjacent the inside diameter surfaces of said convolutions of the bellows and rotatable with said shaft, said split ring being expandable radially into pressure contact with at least a portion of said convolutions in response to centrifugal force created by the rotation of said shaft.

17. The bellows seal assembly of claim 16 also including a channel formed in the outer circumferential surface of said support sleeve for containing said split-ring.

18. The bellows seal assembly of claim 17 also including flanges on the sides of said split-ring extending inwardly into said channel for restraining axial movement of said split-ring with respect to said bellows.

19. The bellows seal assembly of claim 16 also including a mounting sleeve fixed on the shaft, said first end of said bellows being fixed to said mounting sleeve and wherein said support sleeve is integral with said mounting sleeve.

20. The bellows seal assembly of claim 16 wherein said rotating seal comprises a carrier ring surrounding said shaft and fixed to a second end of said bellows member for rotation therewith and a sealing ring surrounding said shaft and fixedly carried and supported by said carrier ring, said sealing ring having a sealing face under constant bias from said bellows for engagement with said mating seal.

21. The bellows seal assembly as set forth in claim 20 wherein said mating seal comprises a mating ring surrounding said rotating shaft, fixed against rotation with said rotating shaft, and having a sealing face sealingly engageable with said sealing face of said rotating seal.

22. A bellows seal assembly for a rotatable shaft comprising:
(a) a bellows having a plurality of annular axially-expandable convolutions surrounding said shaft;
(b) means for mounting said bellows on the shaft for rotation therewith;
(c) a rotatable seal ring fixed to said bellows;
(d) a mating seal ring fixed against rotation with the shaft and adapted to sealingly engage said rotatable seal ring; and
(e) a split-ring positioned between said shaft and said convolutions and rotatable therewith, said split-ring being normally out of engagement with said bellows and operable to exert a vibration-damping pressure contact on at least a portion of said convolutions in response to centrifugal force created by the rotation of said shaft.

23. The bellows seal assembly of claim 22 further comprising support means disposed between said shaft and said convolutions for carrying said split-ring adjacent said convolutions.

24. A bellows sleeve assembly for a rotatable shaft comprising:
(a) a bellows having a plurality of annular axially-expandable convolutions surrounding said shaft;

(b) means fixed to an end of said bellows and mounting said bellows on the shaft for rotation therewith;

(c) a rotatable seal ring fixed to said bellows;

(d) a mating seal ring fixed against rotation with the shaft and adapted to sealingly engage said rotatable seal ring;

(e) a support sleeve integral with said mounting means and between said shaft and said convolutions and fixed to said shaft;

(f) a split ring carried by said support sleeve and positioned between said shaft and said convolutions and rotatable with said shaft, said split ring exerting a vibration-damping pressure contact on at least a portion of said convolutions in response to centrifugal force created by the rotation of said shaft.

25. The bellows seal assembly of claim 24 also including a channel formed in the outer circumferential surface of said support sleeve for containing said split-ring.

26. The bellows seal assembly of claim 25 also including flanges on the sides of said of said split-ring extending inwardly into said channel for preventing axial movement of said split-ring.

27. A vibration-damping device comprising:

an elongated rotatable member;

an annular bellows surrounding at least a portion of the rotatable member;

means for rotating the bellows with the rotatable member; and means rotating with the rotatable member and normally out of engagement with said annular bellows, said rotating means being operable to exert pressure against the inner periphery of the annular bellows in response to the centrifugal force created by the rotatable member on the pressure-exerting means.

28. The device of claim 27 wherein said means for exerting pressure against said bellows includes a radially-expandable split-ring positioned between said bellows and said rotatable member.

29. The device of claim 28 also including means for restraining said pressure-exerting means from axial movement with respect to said annular bellows.

* * * * *